United States Patent
Yu et al.

(10) Patent No.: US 8,340,006 B2
(45) Date of Patent: Dec. 25, 2012

(54) TRANSMISSION OF MULTICAST/BROADCAST SERVICES IN A WIRELESS COMMUNICATION NETWORK

(75) Inventors: Qian Yu, Singapore (SG); Hiramatsu Katsuhiko, Singapore (SG); Ping Luo, Singapore (SG)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 12/296,856

(22) PCT Filed: Apr. 12, 2006

(86) PCT No.: PCT/SG2006/000097
§ 371 (c)(1),
(2), (4) Date: Apr. 23, 2009

(87) PCT Pub. No.: WO2007/117218
PCT Pub. Date: Oct. 18, 2007

(65) Prior Publication Data
US 2009/0303913 A1    Dec. 10, 2009

(51) Int. Cl.
*H04B 7/00*    (2006.01)
(52) U.S. Cl. .................. 370/310; 370/319; 375/295
(58) Field of Classification Search .................. 370/210, 370/310, 312, 319, 320, 321, 322, 326, 332, 370/334, 335, 336, 339, 366, 338, 349, 347, 370/342, 532, 535, 536, 537, 539, 541, 542, 370/474, 252, 431, 464; 375/261, 267, 260, 375/341, 264, 144, 148, 299, 349, 295, 308, 375/265; 455/101, 103, 105, 272
See application file for complete search history.

(56) References Cited

U.S. PATENT DOCUMENTS

| | | | |
|---|---|---|---|
| 5,105,442 A | 4/1992 | Wei | |
| 5,214,656 A | 5/1993 | Chung et al. | |
| 7,340,008 B2* | 3/2008 | Kim et al. | 375/298 |
| 7,620,019 B1* | 11/2009 | Smith et al. | 370/334 |
| 7,769,097 B2* | 8/2010 | Sandhu | 375/267 |
| 7,813,441 B2* | 10/2010 | Jalali et al. | 375/267 |
| 2002/0051433 A1* | 5/2002 | Affes et al. | 370/335 |
| 2003/0060173 A1* | 3/2003 | Lee et al. | 455/103 |

(Continued)

FOREIGN PATENT DOCUMENTS
GB    2 391 775 A    2/2004

OTHER PUBLICATIONS

Sohoware, Inc., "AeroGuard™ MIMO Wireless LAN Solutions" © 2004-2005, www.sohoware.com.

(Continued)

*Primary Examiner* — Abdullah Riyami
(74) *Attorney, Agent, or Firm* — Patterson Thuente Christensen Pedersen, P.A.

(57) ABSTRACT

A method and system for transmitting data in a wireless communications system using multiple transmit antennas. The method comprises the steps of receiving a plurality of data sequences, each assigned with a priority level; encoding each of said plurality of data sequences in accordance with the assigned priority level to form a plurality of coded data sequences, the coded data sequences comprising systematic data and parity data; interleaving said plurality of coded data sequences to form a plurality of interleaved data sequences; multiplexing said plurality of interleaved data sequences to form a plurality of multiplexed data sequences; and mapping said plurality of multiplexed data sequences to form a plurality of mapped data sequences for subsequent transmission of said mapped data sequences from said multiple transmit antennas.

17 Claims, 15 Drawing Sheets

U.S. PATENT DOCUMENTS

| | | | |
|---|---|---|---|
| 2003/0128769 A1* | 7/2003 | Kim et al. | 375/265 |
| 2004/0001429 A1* | 1/2004 | Ma et al. | 370/210 |
| 2004/0062318 A1* | 4/2004 | Yu et al. | 375/264 |
| 2004/0165675 A1* | 8/2004 | Ito et al. | 375/267 |
| 2004/0208145 A1* | 10/2004 | Sim et al. | 370/335 |
| 2005/0068918 A1 | 3/2005 | Mantravadi et al. | |
| 2006/0023666 A1 | 2/2006 | Jalali et al. | |
| 2006/0039409 A1* | 2/2006 | Lampinen | 370/474 |
| 2006/0045169 A1* | 3/2006 | Kim | 375/144 |
| 2006/0274846 A1* | 12/2006 | Bauch | 375/267 |
| 2007/0041461 A1* | 2/2007 | Lu et al. | 375/261 |
| 2007/0189248 A1* | 8/2007 | Chang et al. | 370/338 |
| 2009/0220034 A1* | 9/2009 | Ramprashad et al. | 375/341 |
| 2010/0041351 A1* | 2/2010 | Himayat et al. | 455/101 |
| 2010/0142638 A1* | 6/2010 | Jalali et al. | 375/260 |

OTHER PUBLICATIONS

Kuo, Chih-Hung, et al., "Robust Video Transmission over Wideband Wireless Channel Using Space-Time Coded OFDM Systems," *IEEE Xplore*, pp. 931-936, (2002).

Sabir, M. Farooq, et al., "An Unequal Error Protection Scheme for Multiple Input Multiple Output Systems," *IEEE Explore*, pp. 575-579 (2002).

Kuo, Chih-Hung, et al., "Embedded Space-Time Coding for Wireless Broadcast With Heterogeneous Receivers," *IEEE Explore*, pp. 1749-1753 (2002).

* cited by examiner

Antenna 1

| I branch | $X_0(1)$ | $Y_0(1)$ | $X_0(2)$ | $Y_0(2)$ | $X_0(3)$ | $Y_0(3)$ | $X_0(4)$ | $Y_0(4)$ |
|---|---|---|---|---|---|---|---|---|
| Q branch | $X_1(1)$ | $X_2(1)$ | $X_1(2)$ | $X_2(2)$ | $X_1(3)$ | $X_2(3)$ | $X_1(4)$ | $X_2(4)$ |

Antenna 2

| I branch | $X'_0(1)$ | $Y'_1(1)$ | $X'_0(2)$ | $Y'_1(2)$ | $X'_0(3)$ | $Y'_1(3)$ | $X'_0(4)$ | $Y'_1(4)$ |
|---|---|---|---|---|---|---|---|---|
| Q branch | $X'_1(1)$ | $X'_2(1)$ | $X'_1(2)$ | $X'_2(2)$ | $X'_1(3)$ | $X'_2(3)$ | $X'_1(4)$ | $X'_2(4)$ |

Fig.15

| I branch | $X_0(1)$ | $Y_0(1)$ | $X_0(2)$ | $Y_0(3)$ | $X_0(3)$ | $Y_0(5)$ | $X_0(4)$ | $Y_0(7)$ |
|---|---|---|---|---|---|---|---|---|
| Q branch | $X_1(1)$ | $X_2(1)$ | $X_1(2)$ | $X_2(2)$ | $X_1(3)$ | $X_2(3)$ | $X_1(4)$ | $X_2(4)$ |

Antenna 1

| I branch | $X'_0(1)$ | $Y'_0(2)$ | $X'_0(2)$ | $Y'_0(4)$ | $X'_0(3)$ | $Y'_0(6)$ | $X'_0(4)$ | $Y'_0(8)$ |
|---|---|---|---|---|---|---|---|---|
| Q branch | $X'_1(1)$ | $X'_2(1)$ | $X'_1(2)$ | $X'_2(2)$ | $X'_1(3)$ | $X'_2(3)$ | $X'_1(4)$ | $X'_2(4)$ |

Antenna 2

TRANSMISSION OF MULTICAST/BROADCAST SERVICES IN A WIRELESS COMMUNICATION NETWORK

FIELD OF THE INVENTION

The present invention relates generally to data transmission and reception in multi-input and multi-output (MIMO) wireless communication systems, and more specifically to implementing multi-media broadcast and multicast service (MBMS) in wireless communication systems. The present invention also relates to a method, apparatus and system for transmitting data in a wireless communications system using multiple transmit antennas. The present invention also relates to a computer program product including a computer readable medium having recorded thereon a computer program for transmitting data in a wireless communications system using multiple transmit antennas.

BACKGROUND

Wireless communication systems have traditionally been used to carry voice traffic and low data rate non-voice traffic. Today wireless communication systems are being implemented that also carry high data rate (HDR) multimedia traffic, such as video, data, and other types of traffic. Multimedia Broadcast and Multicast Service (MBMS) channels may be used to transmit streaming applications, such as, radio broadcasts, television broadcasts, movies, and other types of audio or video content.

The multimedia broadcast multicast service (MBMS) is defined in a standard referred to as the 3rd Generation Partnership Project (3GPP) for Release 6. A standard TS22.146 defines high level service requirements of the MBMS, and the 3GPP standard TS22.246 defines typical service scenarios. MBMS services allow user equipment (UE) such as mobile telephones or other mobile terminals to receive services from service providers via the communications network. MBMS is a packet switch (PS) domain service for transferring multimedia data such as audio, pictures, video, etc, to a plurality of terminals using a unidirectional point-to-multipoint (PtM) bearer service.

Since MBMS is a multimedia service, multiple services of different quality of service (QoS) or multiple data sequences of different QoS in the same service may be provided to a single UE or to different UEs, and MBMS transmission mechanisms are needed that support variable source data-rates.

Because a channel is unidirectional, the UE generally does not communicate with a base station since allowing all subscriber units to communicate back to the base station might overload the communication system. Thus, in the context of PtM communication services, when there is an error in the information received by subscriber stations, the subscriber stations may not be able to communicate back to the base station. Consequently, other means of information protection can be desirable.

Among other considerations, transmission of a modulated information signal over a wireless communication channel requires selection of appropriate methods for protecting the information in the modulated signal. Such methods may comprise, for example, encoding, symbol repetition, interleaving, and other methods.

The characteristics and requirements for broadcast/multicast services are specified by 3GPP MBMS, and the related broadcast/multicast service layer functions. Simultaneous distribution of different content data may be required in a MBMS service; and simultaneous reception of more than one MBMS service for one terminal may be required, while MBMS transport services may vary for instance in QoS parameters. In such cases, unequal error protections (UEP) are naturally required to support various QoS of the high data rate communication for MBMS services in the wireless communications systems. Thereinafter, the data sequences with a higher quality requirement or/and a lower rate requirement are defined as the higher priority data, and the data sequences with a lower quality requirement or/and a higher rate requirement are defined as the lower priority data.

Traditionally, there have been two major types of methods of transmitting data applied for UEP. One method is to apply a more powerful conventional error-correcting code to the high priority data sequences. The other method of transmitting data is to use non-uniformly spaced modulation constellation, or hierarchical modulation to provide unequal protection for the data sequences with different priority levels. Coded modulation achieves both power-efficiency and bandwidth-efficiency by combining these two methods, seeing for example, "coded modulation with unequal error protection", L.-F. Wei, et al., U.S. Pat. No. 5,105,442.

Another method of transmitting data combines coded modulation with time division multiplexing, each one of the classes of information being separately coded by using a conventional coded modulation scheme and then time-division-multiplexing the various coded outputs for transmission in different time-slots. An example of such a method can be seen in "multiplexed coded modulation with unequal error protection", Hong Y. Chung, et, al., U.S. Pat. No. 5,214,656.

The above mentioned methods of transmitting data provide good performance of unbalanced data transmission; however have limited capacity due to their single transmit antenna configuration. Multiple-input multiple output (MIMO) communication systems employ multiple antennas at a transmitter and/or a receiver of the communication systems to improve coverage, quality, and capacity. Therefore one possible method to increase the capacity of such a communication system is to use multiple antennas to perform space-time (ST) processing. The conception of combining space-time processing with conventional UEP methods may be employed to achieve more capacity and better quality.

A method of transmitting data which concatenates forward error coding (FEC) with space-time coding (STC) is proposed for UEP in an MIMO system (see, "C. H. Kuo, etal., 'Robust video transmission over wideband wireless channel using space-time coded OFDM system', *WCNC* 2002, vol. 3. March 2002".). Such a method provides more robustness to data sequences with higher priority levels by adopting more powerful FEC, while the embedded space time coding does not provide differentiation between data with different priorities. This kind of concatenation with the unified space-time processing cannot provide further differentiation between data sequences with different priority levels, thus limited QoS levels can be supported. And the implementation complexity of such a method of transmitting data is relative high, since for each priority input data sequence, a space-time coder is applied separately, and two antennas are necessary.

Some methods of transmitting data based on combining different space-time technologies were proposed for UEP in MIMO systems. See for examples, Muhammad Farooq Sabir, Robert W. Heath Jr, and Alan C. Bovik "An unequal error protection scheme for multiple input multiple output systems", *IEEE Asilomar Conference on Signals, Systems and Computers*, vol 1, pp. 575-579, November 2002; and, C. H. Kuo, et al., "Embedded space-time coding for wireless broadcast with heterogeneous receivers", *Globecom* 2000, vol 21, November, 2000. However these proposed methods need to change the coding structure of a space time coder for different protection requirements, and only specific rates, and specific protection ratios are provided when the space-time coders are selected, thus the drawback of the low flexibility and high complexity cannot be overcome.

There is therefore a need in the art for data transmission methods that will simultaneously support various QoS requirements in high rate data transmission of MBMS services at high system flexibility and low implementation complexity.

SUMMARY

It is an object of the present invention to substantially overcome, or at least ameliorate, one or more disadvantages of existing arrangements.

The present invention applies space-time processing and channel coding methods in wireless MIMO systems so that unequal protection may be achieved for MBMS services data transmission with low system complexity. The present invention may also increase the fidelity of transmission for both high priority data sequences and low priority data sequences and increase the flexibility of MIMO systems with unequal capacity.

The present invention provides methods for transmitting and receiving different MBMS services with different QoS in wireless communication systems. These methods are related to Physical layer (PHY) transmission for broadcast and multicast services. A mechanism for employing channel coding together with space-time processing is disclosed to provide unequal error protection for simultaneous different MBMS service delivery.

In one aspect of the invention, a combined communications system is provided for supporting simultaneous various QoS requirements in high rate data transmission systems (3GPP MBMS) at high system flexibility and low implementation complexity. In accordance with the system, the arrangement of the transmission rate and protection robustness of the services is jointly controlled by a channel encoder with various rates and capability, and a space-time mapper which realizes different space-time processing for services with different priority levels. Service or data with higher QoS/lower transmission rate requirements is denoted as higher priority service or data; while service or data with lower QoS/higher rate requirements is denoted as lower priority service or data. That is, service or data with higher QoS/lower transmission rate requirements is assigned a higher priority level.

Both various channel coding schemes and space-time processing methods may provide different levels of protection to the distortion of transmitted data due to fading and noise, and may achieve different data transmission rates. By combining channel coding schemes and space-time processing, more robust data transmission may be provided to higher priority data, while larger transmission rates may be provided to lower priority data sequences. On the other hand, by combining channel coding schemes and space-time processing, further protection may be achieved while increasing data capacity of the communications system at the same time.

In another aspect of the invention, a method is provided which supports different protection for service/data with different priority levels by space-time mapping to different antenna streams. In accordance with the method, space-time coding is realized by space-time mapping other than coder structure design to improve system flexibility. The method also performs space-time processing for data sequences with different priority by multiplexing and mapping to reduce implementation complexity. The method may achieve lower code rate data transmissions via space-time mapping to provide higher level protection for higher-priority data; higher transmission rates may also be achieved via space-time mapping for lower-priority data.

In the described embodiments, different content data with different priority (different services with different QoS requirement) are applied with different channel coding schemes with different transmission rate, then systematic data, parity data for both content data are multiplexed and mapped to a plurality of antenna transmission streams. The described embodiments use multiplexing and mapping to decide on the structure of space-time coding that is applied to different content data sequences, and therefore provide different protection or/and transmission rates for different MBMS services.

According to one aspect of the present invention there is provided a method of transmitting data in a wireless communications system using multiple transmit antennas, said method comprising the steps of:

receiving a plurality of data sequences, each assigned with a priority level;

encoding each of said plurality of data sequences in accordance with the assigned priority level to form a plurality of coded data sequences, the coded data sequences comprising systematic data and parity data;

interleaving said plurality of coded data sequences to form a plurality of interleaved data sequences;

multiplexing said plurality of interleaved data sequences to form a plurality of multiplexed data sequences; and mapping said plurality of multiplexed data sequences to form a plurality of mapped data sequences for subsequent transmission of said mapped data sequences from said multiple transmit antennas.

According to another aspect of the present invention there is provided a wireless communications system for transmitting data, said system comprising:

a transmitter with multiple transmit antennas, said transmitter comprising:

encoder units for receiving a plurality of input data sequences each assigned with a priority level, and encoding each of said plurality of input data sequences in accordance with the assigned priority level to form a plurality of coded data sequences, the coded data sequences comprising systematic data and parity data;

interleaver units for interleaving said plurality of coded data sequences to form a plurality of interleaved data sequences;

multiplexer units for multiplexing said plurality of interleaved data sequences to form a plurality of multiplexed data sequences; and mapping units for mapping said plurality of multiplexed data sequences to a plurality of mapped data sequences for subsequent transmission of said mapped data sequences from said multiple transmit antennas.

According to still another aspect of the present invention there is provided a transmitter for transmitting data on a wireless communications system using a multiple transmit antennas, said transmitter comprising:

encoder units for receiving a plurality of data sequences, each assigned with a priority level, and encoding each of said plurality of data sequences in accordance with the assigned priority level to form a plurality of coded data sequences, the coded data sequences comprising systematic data and parity data;

interleaver units for interleaving said plurality of coded data sequences to form a plurality of interleaved data sequences;

multiplexer units for multiplexing said plurality of interleaved data sequences to form a plurality of multiplexed data sequences; and mapper units for mapping said plurality of multiplexed data sequences to form a plurality of mapped data sequences for subsequent transmission from said multiple transmit antennas.

The foregoing has outlined rather broadly the features and technical advantages of the present invention so that those skilled in the art may better understand the detailed description of the invention that follows. The invention further provides methods, features, transmitter units, receiver units, systems, and other apparatuses as described in detail below. Those skilled in the art should appreciate that they may readily use the conception and the specific embodiment disclosed as a basis for modifying and or designing other structures for carrying out the same purposes of the present invention. Those skilled in the art should also realize that such equivalent constructions do not depart from the spirit and the scope of the invention in its broadest form. Other aspects of the invention are also disclosed.

BRIEF DESCRIPTION OF THE DRAWINGS

Some aspects of the prior art and one or more embodiments of the present invention will now be described with reference to the drawings and appendices, in which:

FIG. 15 shows a logical mapping and combining of systematic and parity data for both priority data used in FIG. 4 and FIG. 14 according to the first embodiment.

FIG. 16 depicts a logical mapping and combining of systematic and parity data for both priority data used in FIG. 6 and FIG. 14 according to the second embodiment.

DETAILED DESCRIPTION INCLUDING BEST MODE

Figure 1:
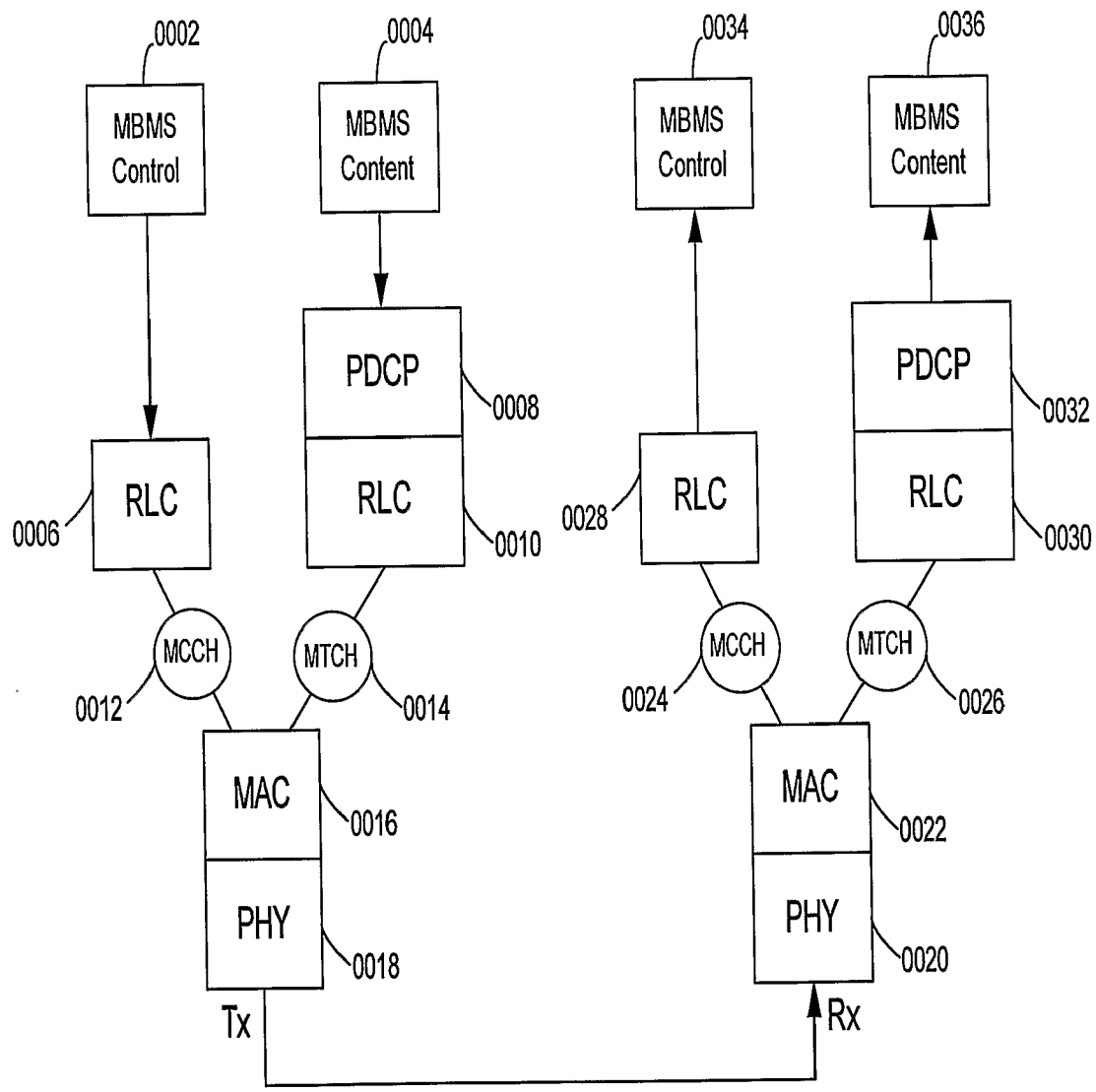
FIG. 1 is an architecture diagram illustrating a protocol architecture for implementation of MBMS services.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

The transmission of MBMS services is known in wireless communications networks. Such services allow user equipment (UE) such as mobile telephones or other mobile terminals to receive services from service providers via a wireless communications network. The services are generally delivered in a packet format, currently in the form of IP (Internet protocol) packets. The services are provided by a service provider to a radio network controller (RNC) which controls how the services are delivered to mobile terminals within the communications network. The radio network controller schedules the transmission of services according to communications network resources and other factors.

In order to establish an MBMS service, a core network (CN) transmits an MBMS context establishment request labeled REQ to the radio network controller labelled RNC1, for example, and the radio network controller RNC1 returns an MBMS context establishment response labeled RESP. The context establishment request includes necessary MBMS parameters, e.g. QoS. It is the responsibility of the radio network controller RNC1 to establish the MBMS context within the RNC for the respective MBMS service. The RNC may establish the MBMS data bearer with the CN before the notification phase or after the notification phase. The RNC determines how the MBMS service will be supplied across the network, and in particular whether the MBMS service will be delivered from a single cell or multiple cells.

FIG. 1 is an architecture diagram illustrating a protocol stack 100 which may be used for implementing MBMS services in accordance with the described embodiments. The protocol stack 100 is configured according to 3GPP and comprises a plurality of layers, beginning at the physical layer (PHY) which represents a signaling link, then a medium access control (MAC) protocol layer, then a radio link control (RLC) protocol layer and then a packet data convergence protocol (PDCP) layer. The 3GPP protocol stack includes a number of other layers, but only the above layers are pertinent to the delivery of MBMS services.

Packet Data Convergence Protocol (PDCP) exists in a user plane for services from the PS domain. Services offered by PDCP can be called radio bearers; PDCP provides the header compression services. PDCP compresses the redundant protocol information at a transmitting entity and decompresses at a receiving entity. PDCP also transfers user data that the PDCP receives in the form of a PDCP Service Data Units (SDU) from the non-access stratum and forwards the PDCP service Data Units to the RLC entity, and vice versa.

The RLC layer performs framing functions to user and control data, that include segmentation/concatenation and padding functionality. The RLC layer typically provides segmentation and retransmission services to the Radio Resource Control (RRC) layer for control data in the control plane and to the application layer for user data in the user plane. The RLC layer typically performs segmentation/reassembly of variable length higher layer Protocol Data Units (PDU) into/from smaller RLC PDUs.

Each RLC instance in the Radio Link Control (RLC) layer can be configured by the RRC layer to operate in one of three modes: the transparent mode (TM), unacknowledged mode (UM), and acknowledged mode (AM). The three data transfer modes indicate the mode in which the RLC is configured for a logical channel. The transparent and unacknowledged mode RLC entities are defined to be unidirectional whereas acknowledged mode entities are bi-directional.

The MAC layer offers services to the RLC layer by means of logical channels that are characterized by the type of data transmitted. The MAC layer maps and multiplexes logical channels to transport channels. The MAC layer identifies the User Equipments (UEs) that are on common channels. The MAC layer also multiplexes/demultiplexes higher layer PDUs into/from transport blocks delivered to/from the physical layer on common transport channels. The MAC layer handles service multiplexing for common transport channels since the service multiplexing can not be done in the physical layer. When a common transport channel carries data from dedicated type logical channels, the MAC header includes an identification of the UE. The MAC layer also multiplexes and demultiplexes higher layer PDUs into/from transport block sets delivered to or from the physical layer on dedicated transport channels.

The physical layer couples to the MAC layer via transport channels that carry signaling information and user data. The physical layer offers services to the MAC layer via transport channels that can be characterized by how and with what characteristic data is transferred. The physical layer receives signaling and user data over the radio link via physical channels. The physical layer typically performs multiplexing and channel coding including cyclic redundancy check (CRC) calculation, forward-error correction (FEC), rate matching, interleaving transport channel data, and multiplexing transport channel data, as well as other physical layer procedures such as acquisition, access, page, and radio link establishment/failure. The physical layer may also be responsible for spreading and scrambling, modulation, measurements, transmit diversity, power weighting, handover, compressed mode and power control.

The Common Traffic Channel (CTCH) is a unidirectional channel existing in the downlink direction and the CTCH can be used when transmitting information either to all terminals or a specific group of terminals. Both of these data transfer modes use unidirectional common channels that do not have a reverse-link channel set up.

FIG. 1 illustrates on the left hand side the application of the above layers in a controlling RNC 101. That is, the RNC 101 receives MBMS content 0004 together with MBMS control signals 0002. The MBMS content 0004 is processed in the packet data convergence protocol layer PDCP 0008. Then, the packetised data is delivered to a data plane of RLC layer 0010, where the MBMS control signals 0002 are delivered respectively to a control plane of the RLC layer 0006. At the RLC layer 0006, RLC PDUs are constructed. To support MBMS data and control, the MAC layer 0016 provides MBMS control channels MCCH 0012 and MBMS traffic channels MTCH 0014 for a base station which will delivery the service. The MBMS service is mapped and multiplexed from logical channels to transport channels in the MAC layer 0016. The MAC layer 0016 communicates with the physical layer 0018 for providing transmission units to delivering the MBMS services to a mobile terminal UE 102 as shown in FIG. 1.

The right hand side of FIG. 1 illustrates the equivalent protocol layers at the mobile terminal UE 102. It is considered in this context that Tx represents the transmission side of the physical link between the base station and mobile terminal UE 102, while Rx represents the received side of channels at the mobile terminal UE 102. The mobile terminal UE 102 implements MAC entities 0022 and provides similar MBMS control channels 0024 and MBMS traffic channels 0026 as for the controlling RNC. The RLC layer 0030 deals with combining the packets which have been delivered by MAC layer entities. The RLC layer 0028 separates out the control functionality. Finally, the PDCP layer 0032 delivers the MBMS content 0036 to a user of the mobile terminal UE 102.

Figure 2:
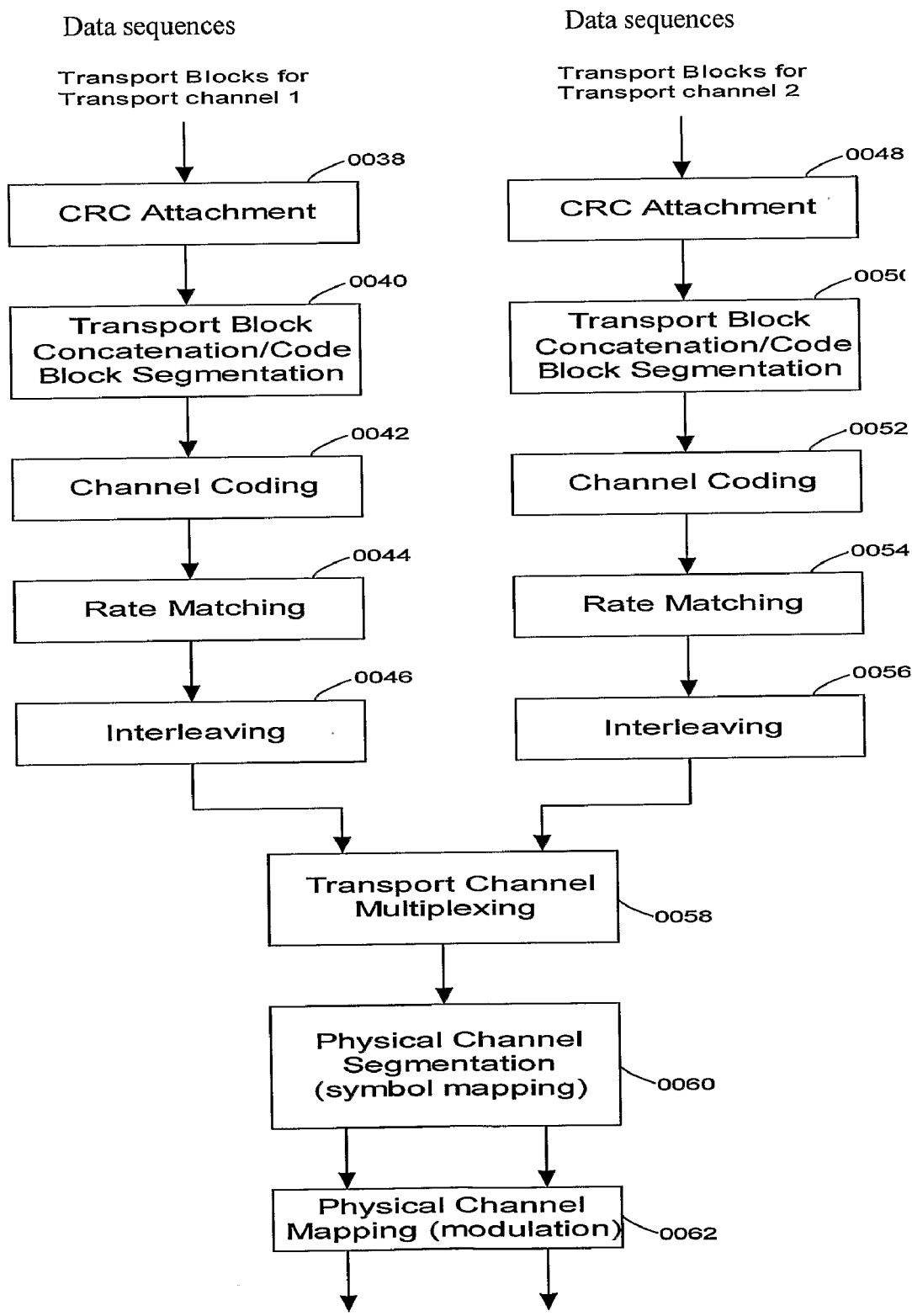
FIG. 2 is a flow diagram showing signal processing at a base station for downlink data transmission, in accordance with the W-CDMA standard.

FIG. 2 is a flow diagram showing signal processing at a base station for downlink data transmission, in accordance with the W-CDMA standard. The upper signaling layers of a W-CDMA system support data transmission on one or more transport channels (e.g., Transport channel 1 and Transport channel 2) to a specific terminal or for a specific MBMS service. Each transport channel (i.e., Transport channel 1 and Transport channel 2) is capable of carrying one or more data sequences for one or more MBMS services. These MBMS services may include voice, video, packet data, and so on, which are collectively referred to herein as "data". The data to be transmitted is initially processed as one or more transport channels at a higher signaling layer. The transport channels (i.e., Transport channel 1 and Transport channel 2) are then mapped to one or more physical channels assigned to the terminal or MBMS service.

As shown in FIG. 2, the data for each transport channel (i.e., Transport channel 1 and Transport channel 2) is provided, in one or more transport data sequences (or blocks) for each TTI, to a respective transport channel processing section. Within each transport channel processing section, each transport data sequence is used to calculate a set of cyclic redundancy check (CRC) bits. As shown in FIG. 2, the CRC bits for Transport Channel 1 and Transport channel 2 are attached to a respective transport data sequence in steps 0038 and 0048, respectively, and are used at the terminal for block error detection. The one or more CRC coded data sequences for each Transport channel 1 and 2 are then serially concatenated together at steps 0040 and 0050, respectively. If the total number of bits after concatenation is greater than the maximum size of a coded data sequence, then the bits for each Transport channel 1 and 2 are segmented into a plurality of coded data sequences in steps 0040 and 0050, respectively. The maximum coded data sequence size is determined by the particular coding scheme (e.g., convolutional, Turbo, or no coding) selected for use for the current TTI, which is specified by the transport format for the TTI for each of Transport channel 1 and Transport channel 2. Each coded data sequence for Transport channel 1 and Transport channel 2 is then coded with the selected coding scheme or not coded at all to generate coded bits in steps 0042 and 0052, respectively.

Rate matching is then performed at steps 0044 and 0054 for each of Transport channel 1 and Transport channel 2, respectively, on the coded bits of the coded data sequences in accordance with a rate-matching attribute assigned by higher signalling layers and specified by the transport format for each of Transport channel 1 and Transport channel 2. The rate matching is performed in order to achieve a required transmission rate for each of Transport channel 1 and Transport channel 2. On the downlink, unused bit positions are filled with discontinuous transmission (DTX) bits. The DTX bits indicate when a transmission should be turned off and are not actually transmitted.

The rate-matched bits for each TTI are then interleaved in accordance with a particular interleaving scheme in steps 0046 and 0056, respectively, to provide time diversity. In accordance with the W-CDMA standard, the interleaving is performed over TTI, which can be selected as 10 msec, 20 msec, 40 msec or 80 msec. When the selected TTI is longer than 10 msec, the bits within the TTI are segmented and mapped onto consecutive transport channel data sequences. Each transport channel data sequence corresponds to the portion of the TTI that is to be transmitted over a physical channel radio frame period.

In W-CDMA, data to be transmitted to a particular terminal or a particular MBMS service is processed as one or more transport channels at a higher signalling layer. The transport channels are then mapped to one or more physical channels assigned to the terminal or the MBMS service.

The transport channel data sequences from all active transport channel processing sections (i.e., Transport channel 1 and Transport channel 2) are serially multiplexed into a coded composite transport channel (CCTrCH) in step 0058. DTX bits may then be inserted into the multiplexed data sequences such that the number of bits to be transmitted matches the number of available bit positions on one or more "physical channels" to be used for the data transmission. If more than one physical channel is used, then the bits are segmented among the physical channels in step 0060. The bits in each multiplexed data sequence for each physical channel are then further interleaved to provide additional time diversity. The interleaved bits are then mapped to the data portions of their respective physical channels.

In W-CDMA, services are assigned transport channels, which are logical channels at a higher layer. The transport channels are then mapped to physical channels in step 0062 at a physical layer. The transport channels are defined by various parameters including: a specific carrier frequency; a specific scrambling code used to spectrally spread the data prior to transmission; a specific channelization code (if needed) used to channelize the data so that it is orthogonal to the data for other physical channels; specific start and stop times.

Described below are methods of signal processing in the physical layer to support simultaneous transmission of MBMS services with different QoSs, in accordance with the coding chain described in FIG. 2, which comprise channel coding, interleaving, multiplexing, and symbol mapping schemes.

The various embodiments described below with reference to FIGS. 3 to 16 are used to describe the principles of the present invention by way of illustration only and should not be construed in any way to limit the scope of the present invention. Those skilled in the art will understand that the described principles may be implemented in any suitably arranged wireless MIMO system. The wireless communication of the system may conform to any of various known communications standards.

Figure 3:
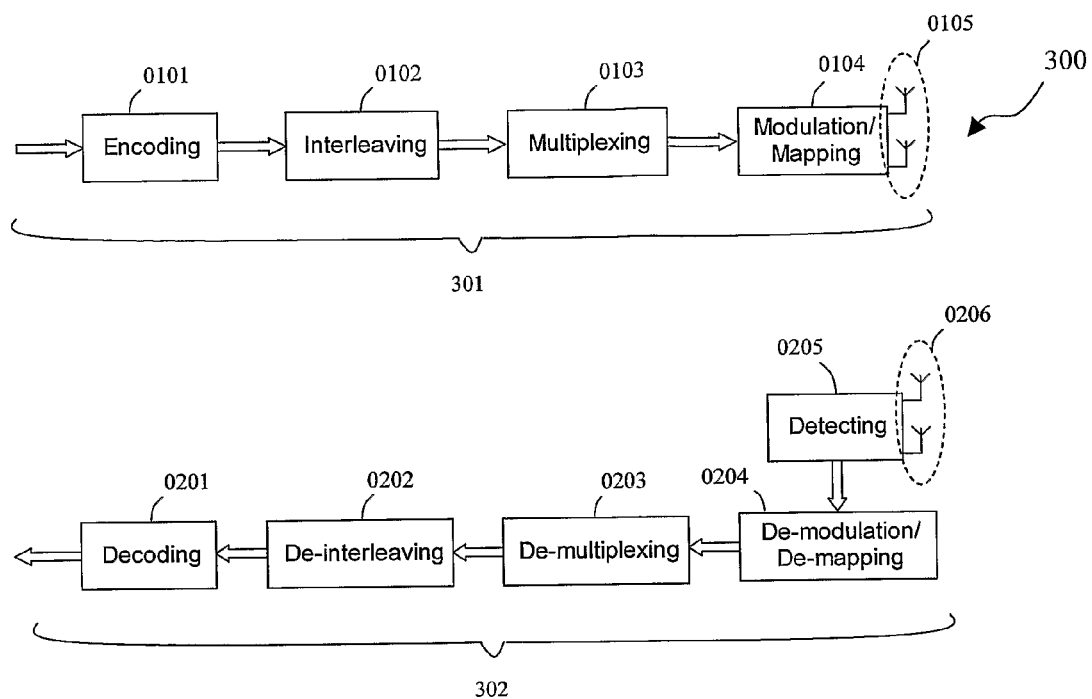
FIG. 3 is a simplified block diagram of a wireless communication system upon which embodiments described may be practiced.

FIG. 3 is a simplified block diagram of a wireless communication system 300 upon which embodiments described may be practiced. At a transmitter 301, information data sequences are sent to encoding units 0101 which perform coding and rate matching to form a plurality of coded data sequences. Then the coded data sequences are provided to interleaving units 0102 to form a plurality of interleaved data sequences and then to multiplexing units 0103 that multiplex the data into a plurality of data streams comprising a plurality of multiplexed data sequences. The multiplexed data sequences are provided to modulating and mapping units 0104 to form a plurality of mapped (modulated) data sequences. The mapped (modulated) data sequences are then transmitted by a plurality of transmit antennas 0105 to a receiver 302.

At the receiver 302, the transmitted signals are received by a plurality of receive antennas 0206 and provided to detecting unit 0205 which detects and separates the received signal to a plurality of detected data sequences. Then the detected data sequences are demodulated and demapped by demodulating and demapping units 0204 to generated demodulated data sequences. The demodulated data sequences are provided to demultiplexing units 0203 which de-multiplex the data into a plurality of demultiplexed data sequences. Then after the interleaving of the interleaver units 0202, the interleaved data sequences are sent into decoding units 0201 to recreate the information data.

Figure 4:
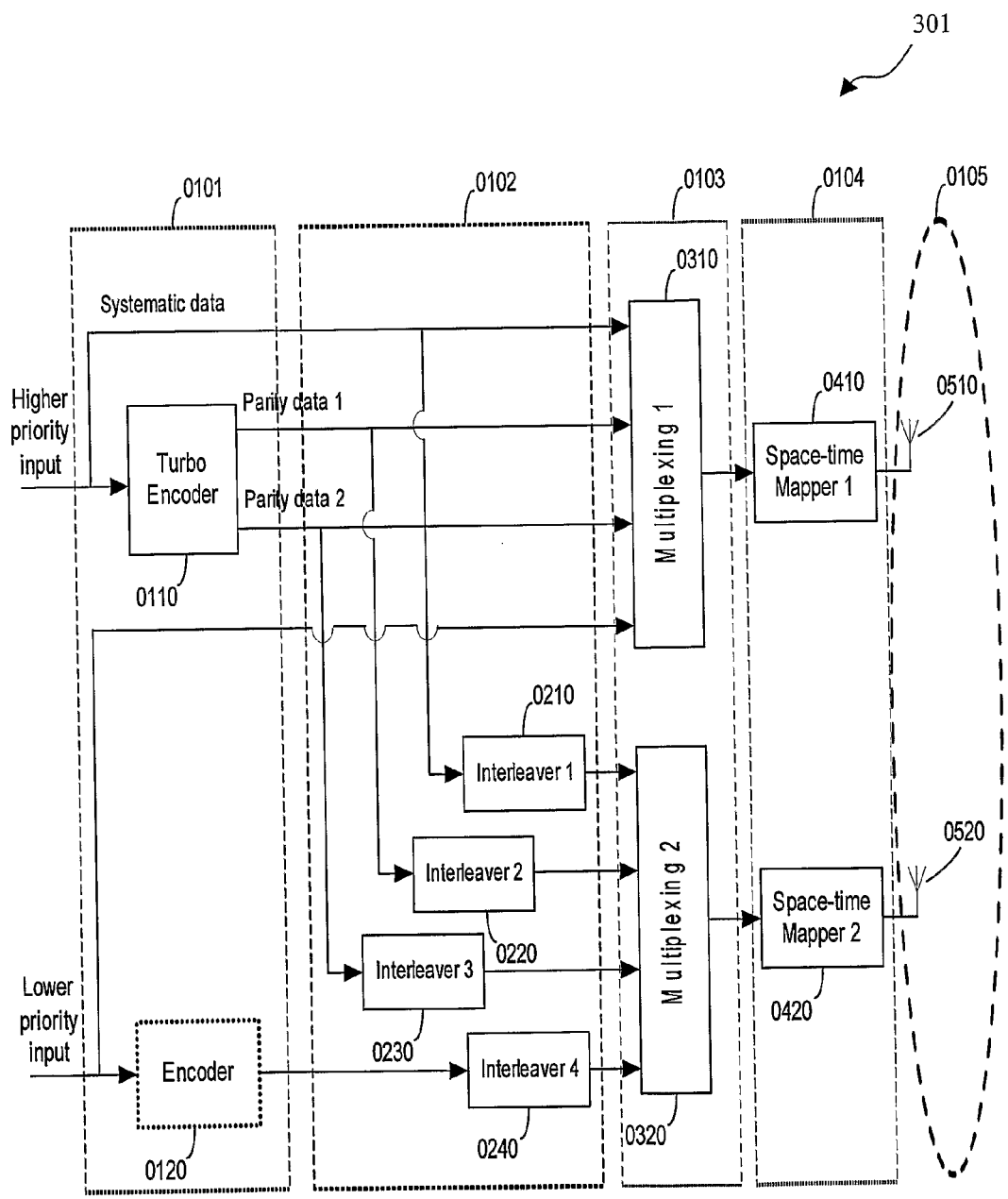
FIG. 4 is a block diagram of a transmitter for employing coding with space-time transmit diversity in a wireless MIMO communications system to provide the unequal error protection according to a first embodiment.

FIG. 4 is a block diagram of the transmitter 301 according to a first embodiment. The transmitter 301 employs various channel coding schemes with various space-time processing to provide the unequal error protection for different MBMS services with different QoS. The input data sequences corresponding to MBMS services are classified into different classes, namely, higher priority input and lower priority input, due to their importance, i.e., requirement of quality or/and data rate. Data sequences with higher QoS/lower rate requirements are denoted as higher priority; while data sequences with lower QoS/higher rate requirements are denoted as lower priority. That is, data sequences with higher QoS/lower transmission rate requirements are assigned a higher priority level and data sequences with lower QoS/lower transmission rate requirements are assigned a lower priority level. The higher priority inputs are encoded by turbo encoder 0110 with a more powerful coding scheme to generate two parity data from input data sequences. While for lower priority inputs, no or a simple coding scheme is implemented by encoder 0120 to generate one parity data from input data sequences. Accordingly, more parity data is generated for higher priority input data sequences during the encoding than for lower priority input data sequences.

Two parity data and systematic data of higher priority data sequences, and the systematic data of the lower priority data sequences are multiplexed by multiplexer 0310 to form multiplexed data sequences comprising a first portion of multiplexed data which is mapped as mapped data sequences to one antenna 0510 by space-time mapper 0410. The space-time mapper 0410 performs space-time processing on the multiplexed data sequences comprising the first portion of multiplexed data. And the two parity data and systematic data of higher priority data sequences, and the parity data of the lower priority data sequences are interleaved within interleavers 0210, 0220, 0230 and 0240, respectively, to form the interleaved data sequences. The interleaved data sequences comprise parity data and/or systematic data of the higher priority data sequences, and the lower priority data sequences. The types of interleavers used in the transmitter 301 depend on the service requirement and are not necessarily different. Then the interleaved data sequences are multiplexed by multiplexer 0320 to form multiplexed data sequences comprising a second portion of multiplexed data which is mapped as mapped data sequences to another antenna 0520 by space-time mapper 0420. The space-time mapper 0420 performs space-time processing on the multiplexed data sequences comprising the second portion of multiplexed data. Note that the space-time processing (or mapping schemes) of the space-time mapper 0410 and the space-time mapper 0420 may be different or same.

The embodiment shown in FIG. 4 combines the systematic data, parity data from higher priority data sequences, and the systematic data from lower priority data sequences, with the systematic data of the interleaved data sequences, parity data from higher priority data sequences, and the parity data from lower priority data sequences, for transmission on a given channel via a given antenna within the transmitter diversity wireless MIMO system. Systematic data X0, parity data X1, and parity data X2 and systematic data Y0 are concatenated together by multiplexer 0310 to form the multiplexed data sequences comprising the first portion of multiplexed data for transmission over one channel via antenna 0510. The interleaved version of systematic data X0, parity data X1, and parity data X2 and systematic data Y1 are concatenated together by multiplexer 0320 to form the multiplexed data sequences comprising the second portion of multiplexed data for transmission over the second independent channel via antenna 0520.

Figure 5:
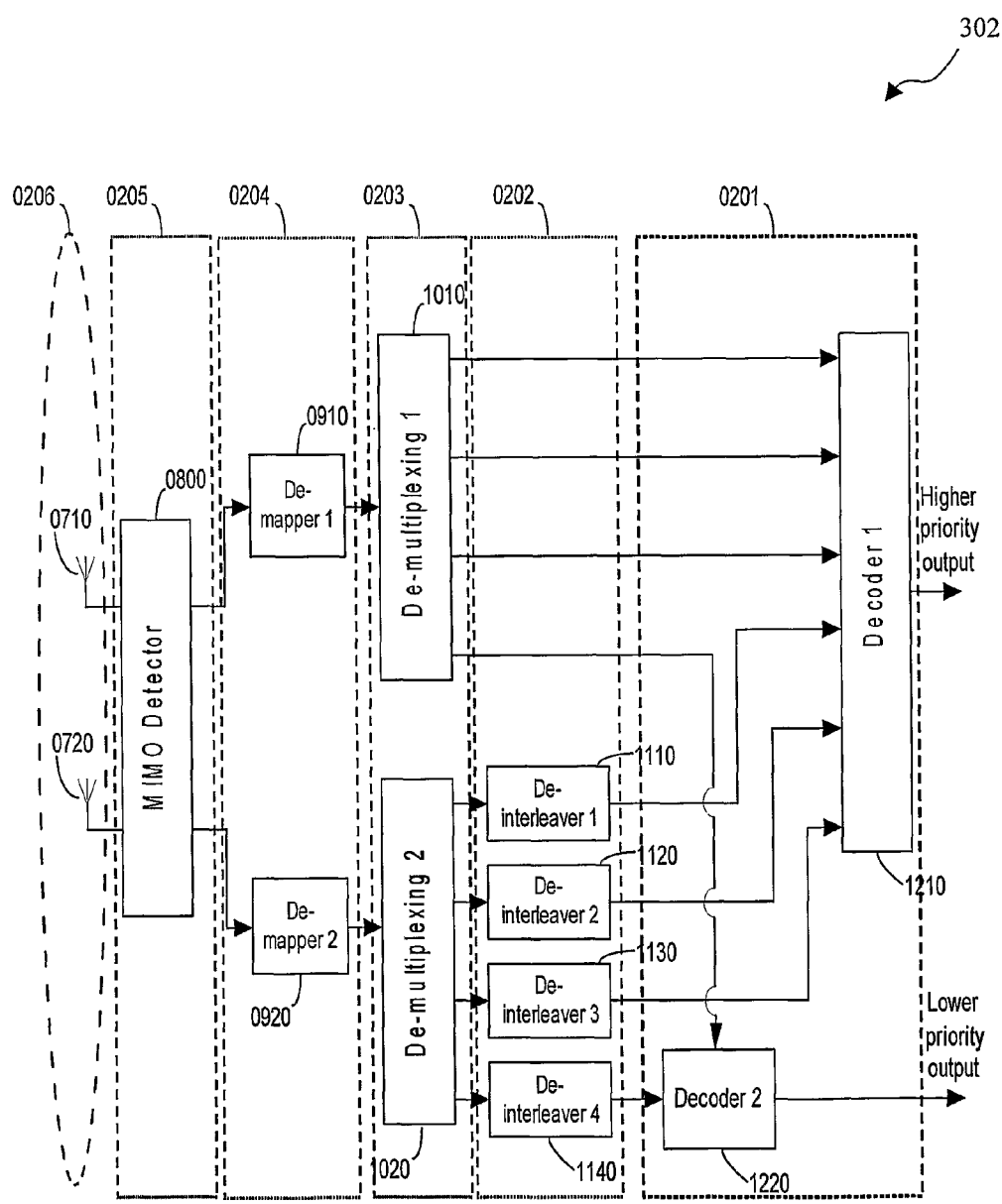
FIG. 5 is a block diagram of a receiver for use in conjunction with transmitter of FIG. 4 according to the first embodiment.

FIG. 5 illustrates a block diagram of the receiver 302 for use in conjunction with the transmitter 301 of FIG. 4 according to the first embodiment. At the receiver 302, the signals from a plurality of receiver antennas 0710 and 0720 are first combined and then applied to MIMO detector 0800 for recovering the transmitted signals. The MIMO detector 0800 can be employed in any suitable manner. For example, a linear estimator matrix may be constructed by the channel information, to effectively separate the plurality of transmitted signals arriving at the receiver antennas 0710 and 0720. For another example, optimal techniques may be employed based on maximum likelihood (ML), or maximum a posteriori (MAP) algorithms. Also, a decision-feedback structure may be employed as an example for the MIMO detector 0800 to implement iterative detection. Signals transmitted by transmitter antennas 0510 and 0520 are detected and split into first branch and second branch detected data sequences by the MIMO detector 0800.

Then demapping is performed on detected data sequences in each branch respectively via demapper 0910 and demapper 0920 to form a plurality of demapped data sequences. After demapping, the demapped data sequences of each branch are demultiplexed by demultiplexer 1010 and demultiplexer 1020 to form a plurality of demultiplexed data sequences. Non-interleaved versions of systematic data, parity data 1, parity data 2 for higher priority data sequences and systematic data for lower priority data sequences in the demultiplexed data sequences are separated after demultiplexing in first branch. Interleaved versions of systematic data, parity data 1, parity data 2 from higher priority data sequences and parity data from lower priority data sequences in the demultiplexed data sequences are separated after demultiplexing in the second branch. Demultiplexer 1010 and demultiplexer 1020 perform inverse processing in multiplexer 0310 and multiplexer 0320, respectively. In second branch, the demultiplexed data sequences are deinterleaved by deinterleavers 1110, 1120, 1130 and 1140 to generate deinterleaved data sequences comprising versions of systematic data, parity data 1, parity data 2 from higher priority data and parity data for lower priority data sequences. The deinterleavers 1110, 1120, 1130 and 1140 perform the inverse processing to the interleavers 0210, 0220, 0230 and 0240, respectively.

Then the deinterleaved data sequences comprising systematic data, parity data 1, parity data 2 for higher priority data sequences from first branch, and the received systematic data, parity data 1, parity data 2 for higher priority data sequences from second branch, are applied to decoder 1210 as lower code rate transmission to recreate the higher priority information data sequences. The systematic data for lower priority data sequences of deinterleaved data sequences from first branch are combined with the parity data for lower priority data sequences of deinterleaved data sequences from second branch, and then applied to decoder 1220 to recreate the lower priority information data sequences. The type of decoder 1220 is dependent on the encoder 0120 at the transmitter.

Figure 6:
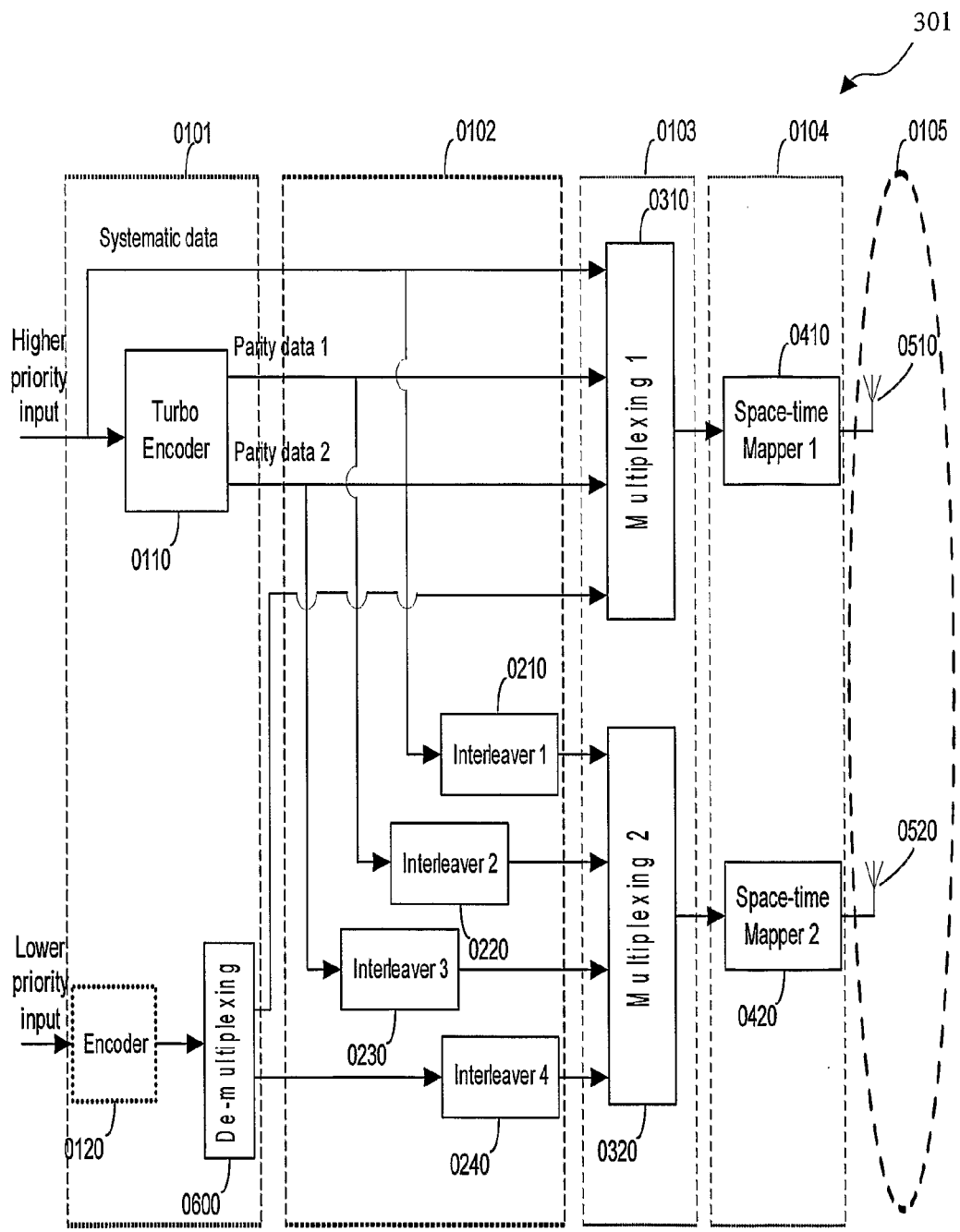
FIG. 6 is a block diagram of a transmitter for employing coding with space-time transmit diversity in a wireless MIMO communications system to provide the unequal error protection according to a second embodiment.

FIG. 6 is a block diagram of the transmitter 301 according to a second embodiment. Input data sequences also classified into different classes, namely, higher priority input and lower priority input, due to their importance, i.e., requirement of quality or/and data rate. The higher priority input are encoded by a turbo encoder 0110 with a more powerful coding scheme, to generate two parity data from systematic or information data. While for lower priority input, no or simple coding is implemented by encoder 0120 to generate encoded data from systematic data.

Different from the embodiment shown in FIG. 4, in the second embodiment of FIG. 6, in order to achieve rate matching the coded data sequences for lower priority input is applied to demultiplexer 0600 to split the coded data sequences into two output coded data sequences comprising a first subset of data sequence Y1 and second subset of data sequence Y2.

Two parity data and systematic data of higher priority data sequences, and the one subset of data of the lower priority data sequences are multiplexed by multiplexer 0310, to form multiplexed data sequences which are mapped as mapped data sequences to one antenna 0510 by space-time mapper 0410. And the two parity data and systematic data of higher priority data sequences, and the another subset data of the lower priority data sequences are interleaved within interleavers 0210, 0220, 0230 and 0240 respectively to form the interleaved data sequences. The types of interleavers depend on the service requirement and are not necessarily different. Then the interleaved data sequences are multiplexed by multiplexer 0320 to form multiplexed data sequences which are mapped as mapped data sequences to another antenna 0520 by space-time mapper 0410. Note that the mapping schemes of space-time mapper 0410 and space-time mapper 0420 may be different or same.

The second embodiment shown in FIG. 6 combines the systematic data, parity data from higher priority data, and the one subset of data from lower priority data, with the interleaved versions of systematic data, parity data from higher priority data, and the another subset of data from lower priority data, for transmission on a given channel via a given antenna within the transmitter diversity wireless MIMO communications system 300. Systematic data X0, parity data X1, and parity data X2 and first subset of data Y1 are concatenated together by multiplexer 0310 to form multiplexed data sequences comprising a first portion of multiplexed data for transmission over one channel via antenna 0510. The interleaved version of systematic data X0, parity data X1, and parity data X2 and second subset of data Y2 are concatenated together by multiplexer 0320 to form multiplexed data sequences comprising a second portion of multiplexed data for transmission over the second independent channel via antenna 0520.

Figure 7:
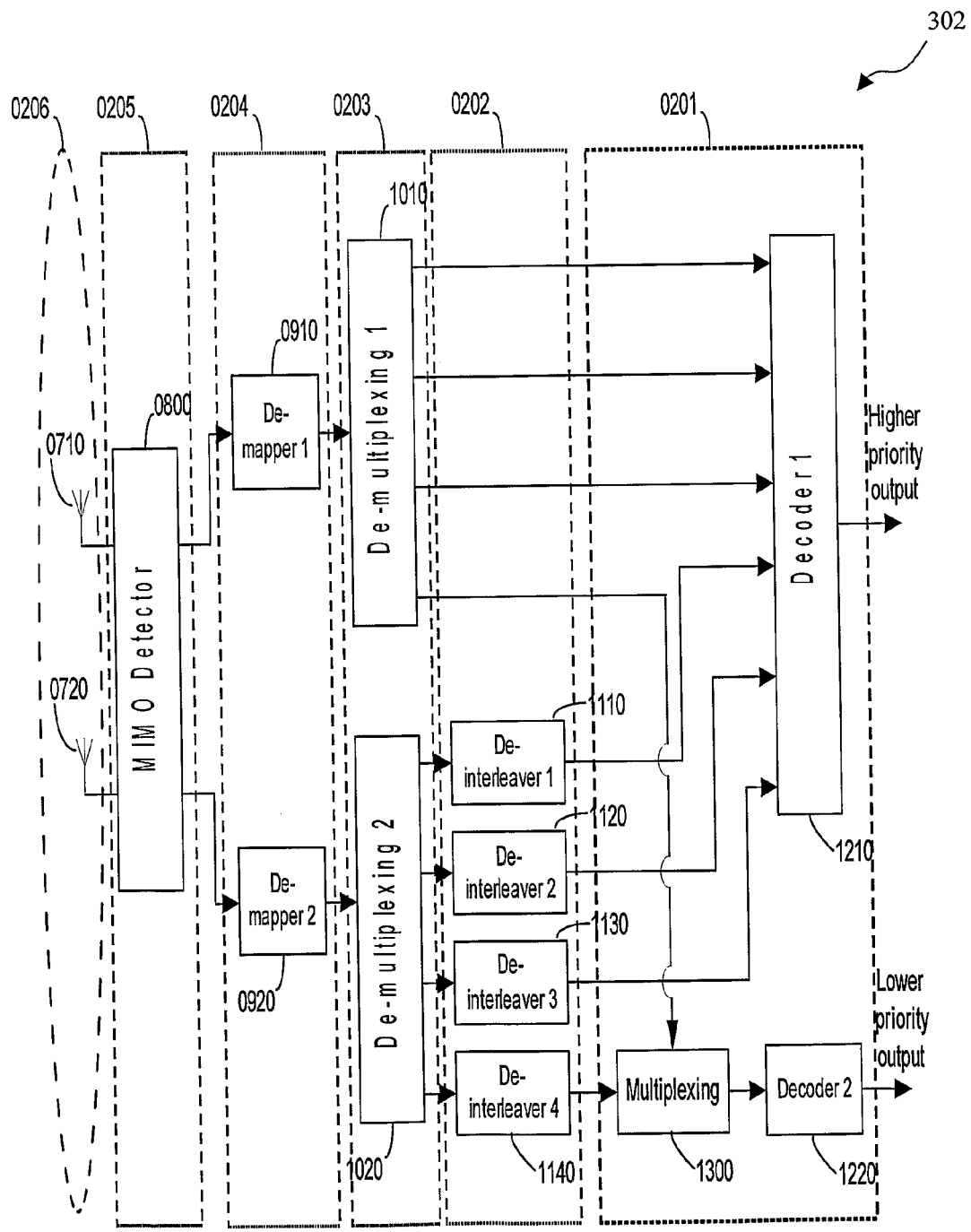
FIG. 7 illustrates a block diagram of a receiver for use in conjunction with transmitter of FIG. 6 according to the second embodiment.

FIG. 7 illustrates a block diagram of the receiver 302 for use in conjunction with transmitter 301 of FIG. 6 according to the second embodiment. At the receiver 302, the signals from a plurality of receiver antennas 0710 and 0720 are first combined and then applied to the MIMO detector 0800 for recovering the transmitted signals. The signals transmitted by transmitter antennas 0510 and 0520 are detected and split into first branch and second branch detected data sequences by the MIMO detector 0800. Then demapping is performed on the detected data sequences in each branch respectively via demapper 0910 and demapper 0920 to form a plurality of demapped data sequences. After demapping, the demapped data sequences of each branch are demultiplexed by demultiplexer 1010 and demultiplexer 1020 to form a plurality of demultiplexed data sequences. Non-interleaved versions of systematic data, parity data 1, parity data 2 for higher priority data sequences and first subset of data for lower priority data sequences in the demultiplexed data sequences are separated after demultiplexing in first branch/Interleaved versions of systematic data, parity data 1, parity data 2 from higher priority data sequences and second subset data from lower priority data sequences in the demultiplexed data sequences are separated after demultiplexing in the second branch. Demultiplexer 1010 and demultiplexer 1020 perform the inverse processing in the multiplexer 0310 and multiplexer 0320 respectively. In second branch, the separated data sequences are deinterleaved by deinterleavers 1110, 1120, 1130 and 1140 to generate the deinterleaved data sequences comprising versions of systematic data, parity data 1, parity data 2 from higher priority data and second subset of data for lower priority data. The deinterleavers 1110, 1120, 1130 and 1140 perform the inverse processing in the interleavers 0210, 0220, 0230 and 0240, respectively.

Then the deinterleaved data sequences comprising systematic data, parity data 1, parity data 2 for higher priority data sequences from first branch, and the received systematic data, parity data 1, parity data 2 for higher priority data from second branch, are applied to decoder 1210 as lower code rate transmission to recreate the higher priority information data sequences. The first subset of data for lower priority data sequences of deinterleaved data sequences from first branch are combined with the second subset of data for lower priority data sequences of deinterleaved data sequences from second branch, and then applied to multiplexer 1300 to combine into one received multiplexed data sequence. The multiplexer 1300 performs the inverse processing in the demultiplexer 0600. Then the multiplexed data sequences are sent to decoder 1230 to recreate the lower priority information data sequences. The type of decoder 1230 is dependent on the encoder 0120 at the transmitter 301.

Comparing the embodiment shown in FIG. 4 and FIG. 5 with the embodiment shown in FIG. 6 and FIG. 7, for higher priority data transmission, the data rate and the quality of error protection are the same in both embodiments, while for lower priority data transmission, the data rate in the second embodiment of FIGS. 6 and 7 is higher than that in the first embodiment of FIGS. 4 and 5, and the quality of error protection in the first embodiment of FIGS. 4 and 5 is higher than that in the second embodiment of FIGS. 6 and 7.

Figure 8:
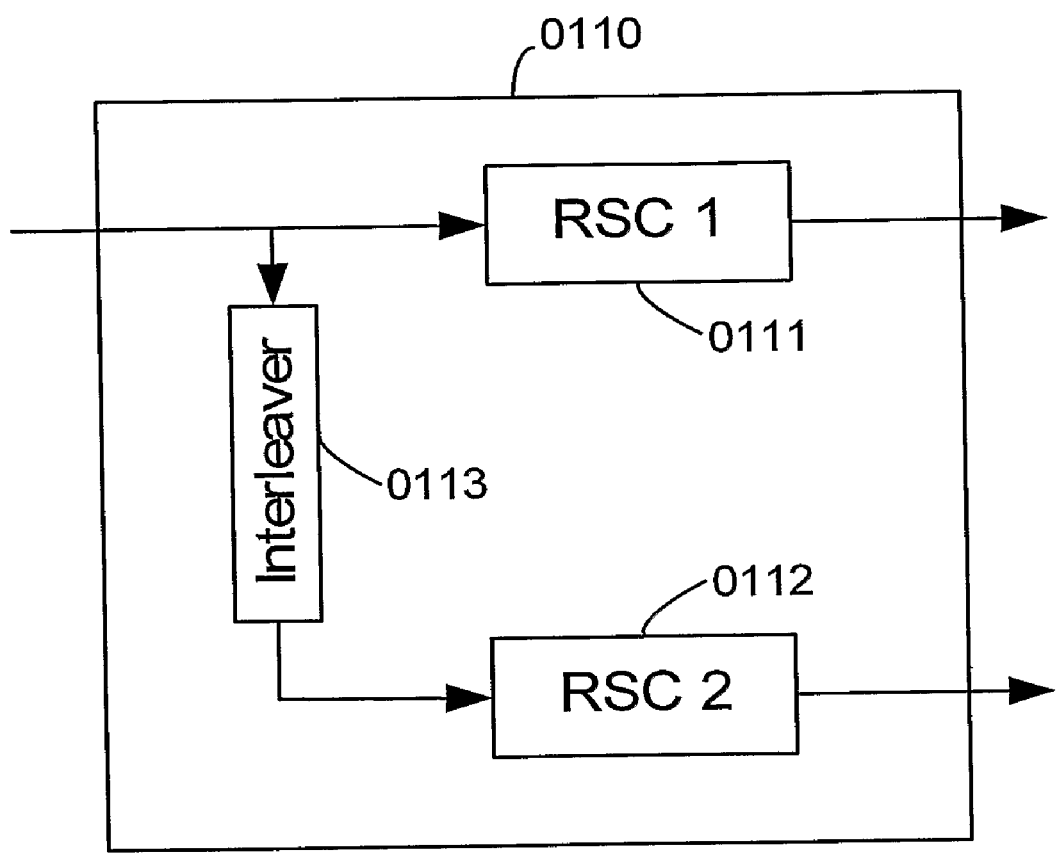
FIG. 8 is a block diagram of a Turbo Encoder used in the transmitters shown in FIG. 4 and FIG. 6.

FIG. 8 is a block diagram of turbo encoder 0110 used in the transmitter 301 shown in both FIG. 4 and FIG. 6. Turbo-coding refers to parallel concatenated recursive systematic convolutional (RSC) coding, forward error correction (FEC) coding in which an information data sequence is encoded twice, with the second encoding being performed after random interleaving of the information sequence. Each RSC encoder within a turbo-encoder produces parity data from systematic or information data. The turbo-encoder 0110 receives systematic data and passes the systematic data to a first encoder 0111, which generates parity data from the systematic data utilizing RSC coding. The received systematic data is also interleaved within interleaver 0113, with the interleaved systematic data passed to a second encoder 0112 which generates parity information for the interleaved systematic data, also utilizing RSC coding.

Figure 9:
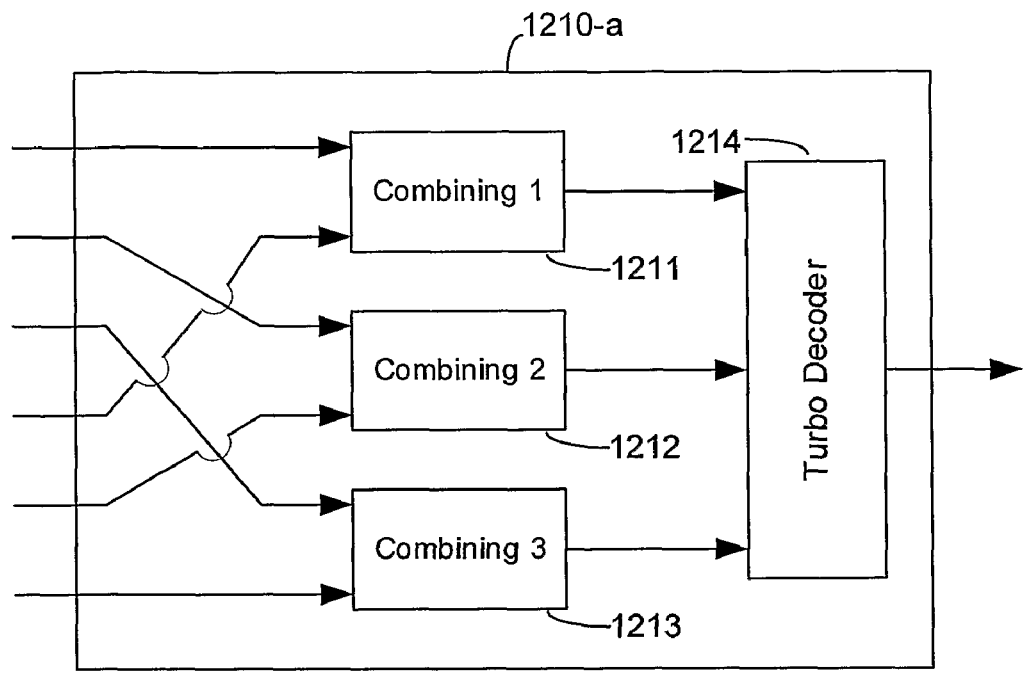
FIG. 9 is a block diagram of a Decoder 1 used in the receivers shown in FIG. 5 and FIG. 7 according to one embodiment.

FIG. 9 is a block diagram of the Decoder 1 1210-*a* used in the receiver 302 shown in both FIG. 5 and FIG. 7 according to one embodiment. The Decoder 1 1210-*a* has six inputs: received systematic data, parity data 1, parity data 2 for higher priority data from first branch, and the de-interleaved versions of received systematic data, parity data 1, parity data 2 for higher priority data from second branch. Then the systematic data from the two branches are combined by combiner 1211 to generate the combined systematic data; the parity data 1 from two branches are combined by combiner 1212 to generate the combined parity data 1; the parity data 2 from two branches are combined by combiner 1213 to generate the combined parity data 2. After combining, the combined systematic data, parity data 1 and parity data 2 are applied to turbo decoder 1214 to recreate the higher priority information data.

Figure 10:
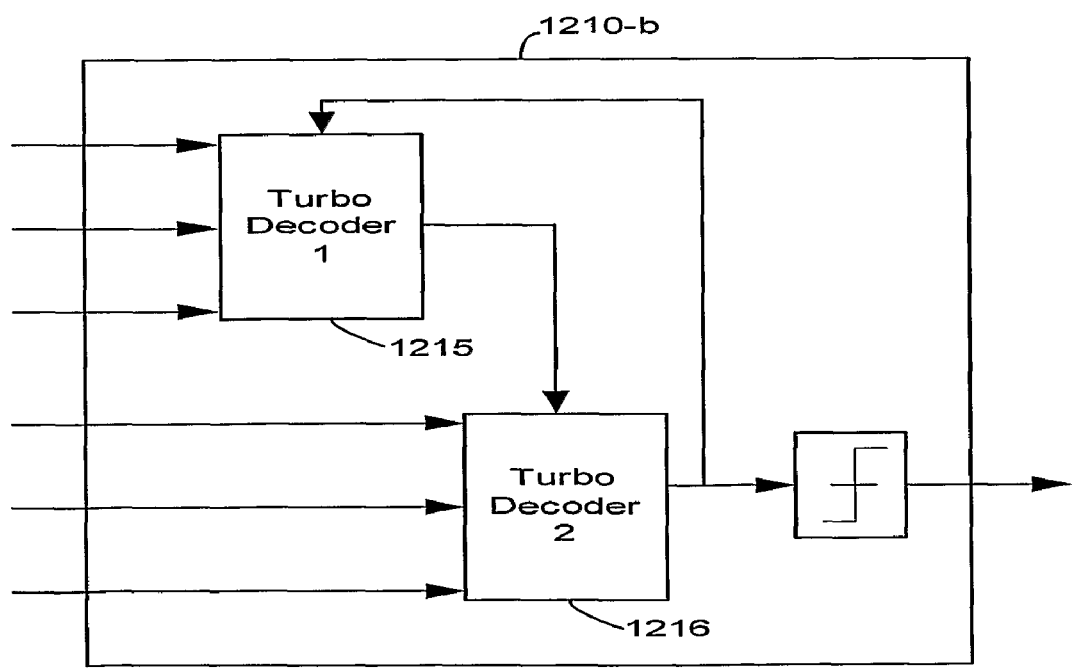
FIG. 10 is a block diagram of a Decoder 1 used in the receivers shown in FIG. 5 and FIG. 7 according to one embodiment.

FIG. 10 illustrates a block diagram of the Decoder 1 1210-*b* used in the receiver 302 shown in both FIG. 5 and FIG. 7 according to another embodiment of the invention. The Decoder 1 1210-*b* has six inputs: received systematic data, parity data 1, parity data 2 for higher priority data from first branch, and the de-interleaved versions of received systematic data, parity data 1, parity data 2 for higher priority data from the second branch. The three inputs from the first branch and the a priori information derived from turbo decoder 2 1216 are applied to the turbo decoder 1 1215, and then the output of turbo decoder 1 1215 becomes the a priori information of the turbo decoder 2 1216. The three inputs from second branch and the a priori information derived from turbo decoder 1 1215 are applied to the turbo decoder 2 1216, and then the output of turbo decoder 2 1216 becomes the a priori information of the turbo decoder 1 1215. Through iterative decoding, final estimation of higher priority information data is found by the output of the turbo decoder 2 1216.

Figure 11:
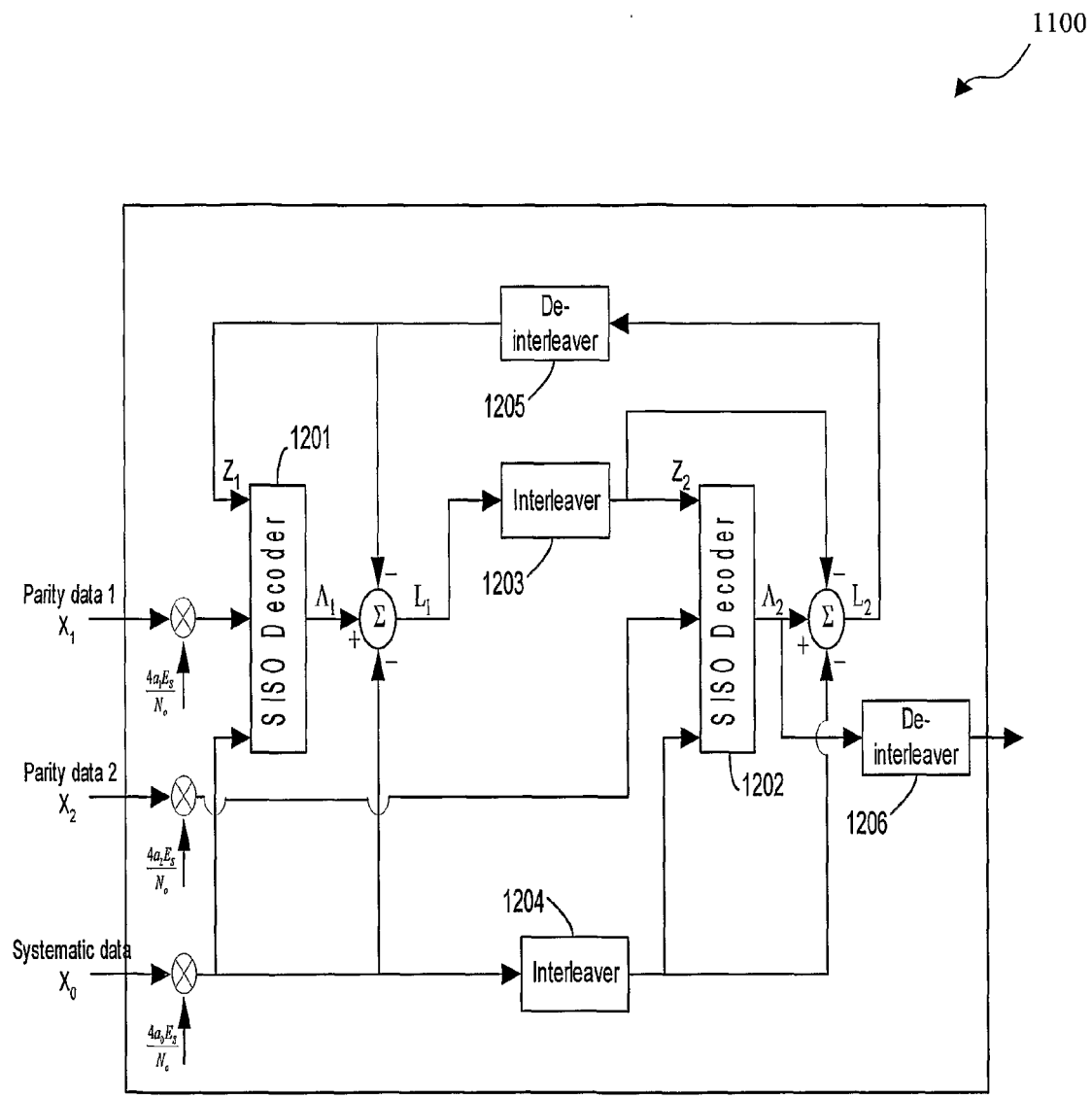
FIG. 11 is a block diagram of a Turbo Decoder used in the receivers shown in FIG. 9 and FIG. 10.

FIG. 11 illustrates a block diagram of a Turbo Decoder 1100 used in receivers shown in both FIG. 9 and FIG. 10. The Turbo decoder 1100 is constructed by two concatenated soft-input/soft-output (SISO) decoders. The output of one SISO decoder can be used as a priori information by the other SISO decoder. According to FIG. 7, a constituent decoder 1201 accepts three inputs: received systematic data, parity data 1 and the a priori information $Z_1$ derived from the output of constituent decoder 1202. The decoder 1201 then produces a posteriori information $\Lambda_1$ as its output. Also, the constituent decoder 1202 accepts three inputs: received systematic data after interleaving by interleaver 1204, parity data 2 and the a priori information $Z_2$ derived from the output of constituent decoder 1201. The decoder 1202 then produces a posteriori information $\Lambda_2$ as its output. After several iterations, the final output is the output of the decoder 1202 after de-interleaving by interleaver 1206. The SISO decoders 1201 and 1202 may be implemented based on maximum a posterior (MAP) or soft output Viterbi algorithm (SOVA) detection algorithms.

Figure 12:
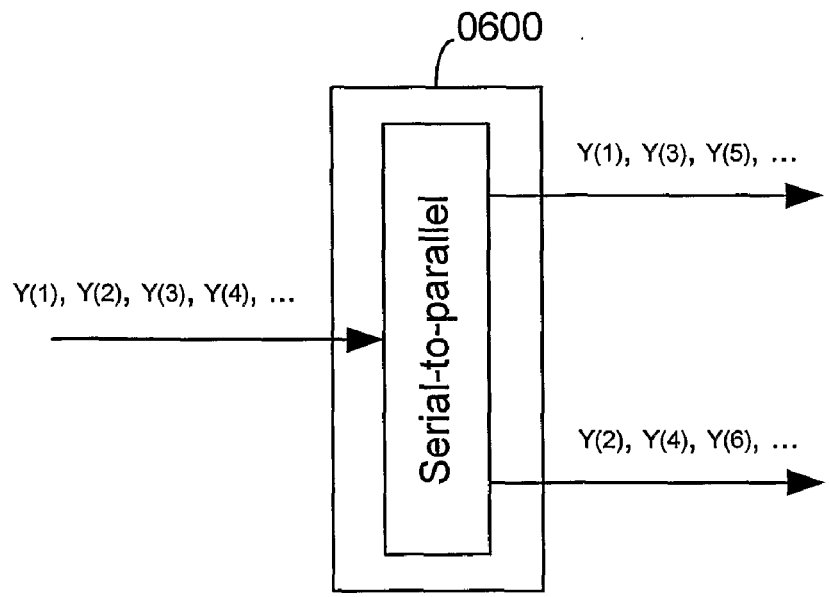
FIG. 12 is a diagram of De-multiplexing used in the transmitter shown in FIG. 6.

FIG. 12 illustrates a diagram of De-multiplexing used in the transmitter 301 shown in FIG. 6. The input data sequences are split to two output data sequence within the demultiplexer 0600, for example, the input data sequence {Y(1),Y(2),Y(3), Y(4),Y(5),Y(6),Y(7),Y(8),...} is spilt to the first output data sequence {Y(1),Y(3),Y(5),Y(7),...} and the second output data sequence {Y(2), Y(4), Y(6), Y(8), ... } to transmit simultaneously.

Figure 13:
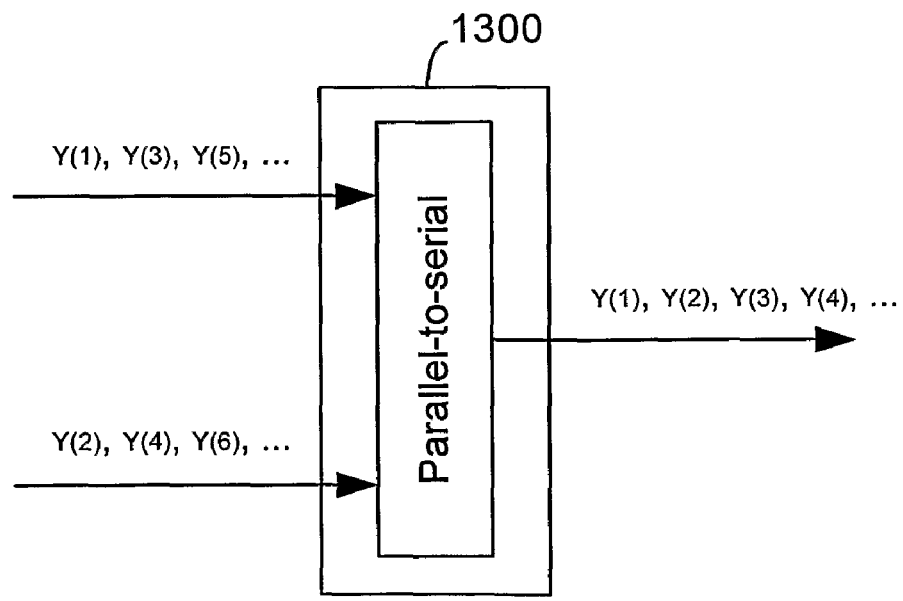
FIG. 13 is a diagram of Multiplexing used in the receiver shown in FIG. 7.

FIG. 13 illustrates a diagram of multiplexing used in the receiver 302 shown in FIG. 7. The two input data sequences are combined to obtain one output multiplexed data sequence within the multiplexer 1300, for example, the first input data sequence {Y(1), Y(3), Y(5), Y(7), ... } and the second input data sequence {Y(2),Y(4),Y(6),Y(8),...} which transmit in parallel, are combined to the one output multiplexed data sequence {Y(l),Y(2),Y(3),Y(4),Y(5),Y(6),Y(7),Y(8),...}.

Figure 14:
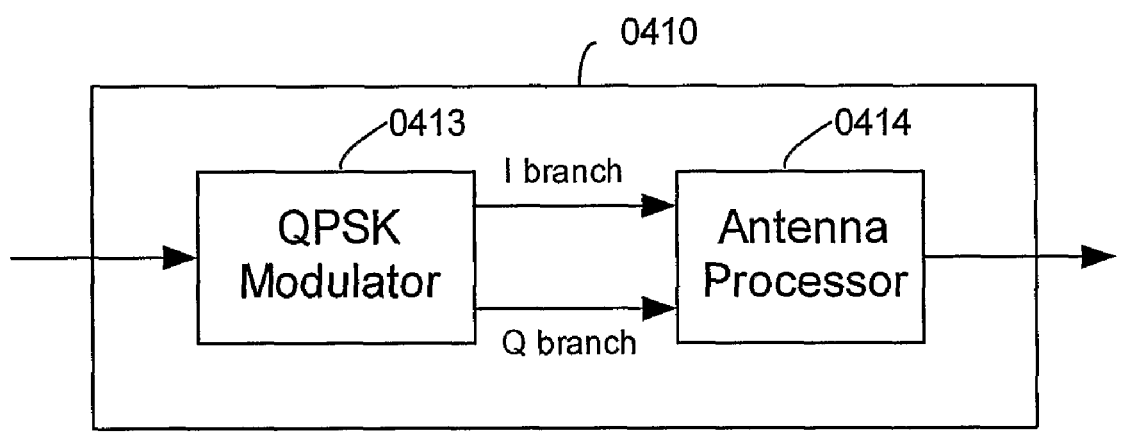
FIG. 14 is a block diagram of the Space-time Mapper used in the transmitter shown in FIG. 4 and the transmitter shown in FIG. 6

FIG. 14 illustrates a block diagram of the Space-time Mapper 0410 used in the transmitter 301 shown in FIG. 4 and transmitter 301 shown in FIG. 6. The multiplexed data sequences are modulated by QPSK modulator 0413 utilizing QPSK modulation, that is, the multiplexed data sequences are modulated in terms of the in-phase and quadrature phase component to transmit different subset of the data respectively. Then I-branch and Q-branch data are arranged to the antenna transmission stream by the antenna processor 0414. The antennas processor 0414 may provide orthogonal (or near-orthogonal) spreading for the mapped data sequences being transmitted on the antennas 0510 and 0520 which provide transmit diversity in wireless transmission. Accordingly, the data sequences to be transmitted from the antennas 0510 and 0520 are mutually orthogonal (or near-orthogonal). The mapped data sequences may also be referred to as complex modulated data sequences.

FIG. 15 depicts a logical mapping and combining of systematic and parity data for both priorities of data used in FIG. 4 and FIG. 14 according to the first embodiment of FIGS. 4 and 5. For the first embodiment shown in FIG. 4, with the space-time mapper 0410 shown in FIG. 14 is employed, FIG. 15 provides one scheme to map the non-interleaved and interleaved version of systematic data, two parity data for higher priority data, and the non-interleaved systematic data, and one interleaved parity data for lower priority data, to the antenna transmission streams. According to FIG. 15, in the first antenna stream, the I branch transmits the non-interleaved systematic data of higher priority data sequences, and the non-interleaved systematic data of lower priority data sequences, the Q branch transmits the non-interleaved parity data 1 and parity data 2 of higher priority data; in second antenna stream, the I branch transmits the interleaved systematic data of higher priority data, and the interleaved parity data of lower priority data, the Q branch transmits the interleaved parity data 1 and parity data2 of higher priority data.

FIG. 16 depicts a logical mapping and combining of systematic and parity data for both priorities data used in FIG. 6 and FIG. 14 according to the second embodiment of FIGS. 6 and 7. For the first embodiment shown in FIG. 6, with the space-time mapper 0410 shown in FIG. 14 is employed, FIG. 16 provide one scheme to map the non-interleaved and interleaved version of systematic data, two parity data for higher priority data sequences, and the non-interleaved one subset of data, and interleaved another subset data for lower priority data sequences, to the antenna transmission streams. According to FIG. 16, in the first antenna stream, the I branch transmits the non-interleaved systematic data of higher priority data, and the non-interleaved first subset of data of lower priority data, the Q branch transmits the non-interleaved parity data 1 and parity data2 of higher priority data sequences; in second antenna stream, the I branch transmits the interleaved systematic data of higher priority data, and the interleaved second subset of data of lower priority data sequences, the Q branch transmits the interleaved parity data 1 and parity data2 of higher priority data.

Figure 17:
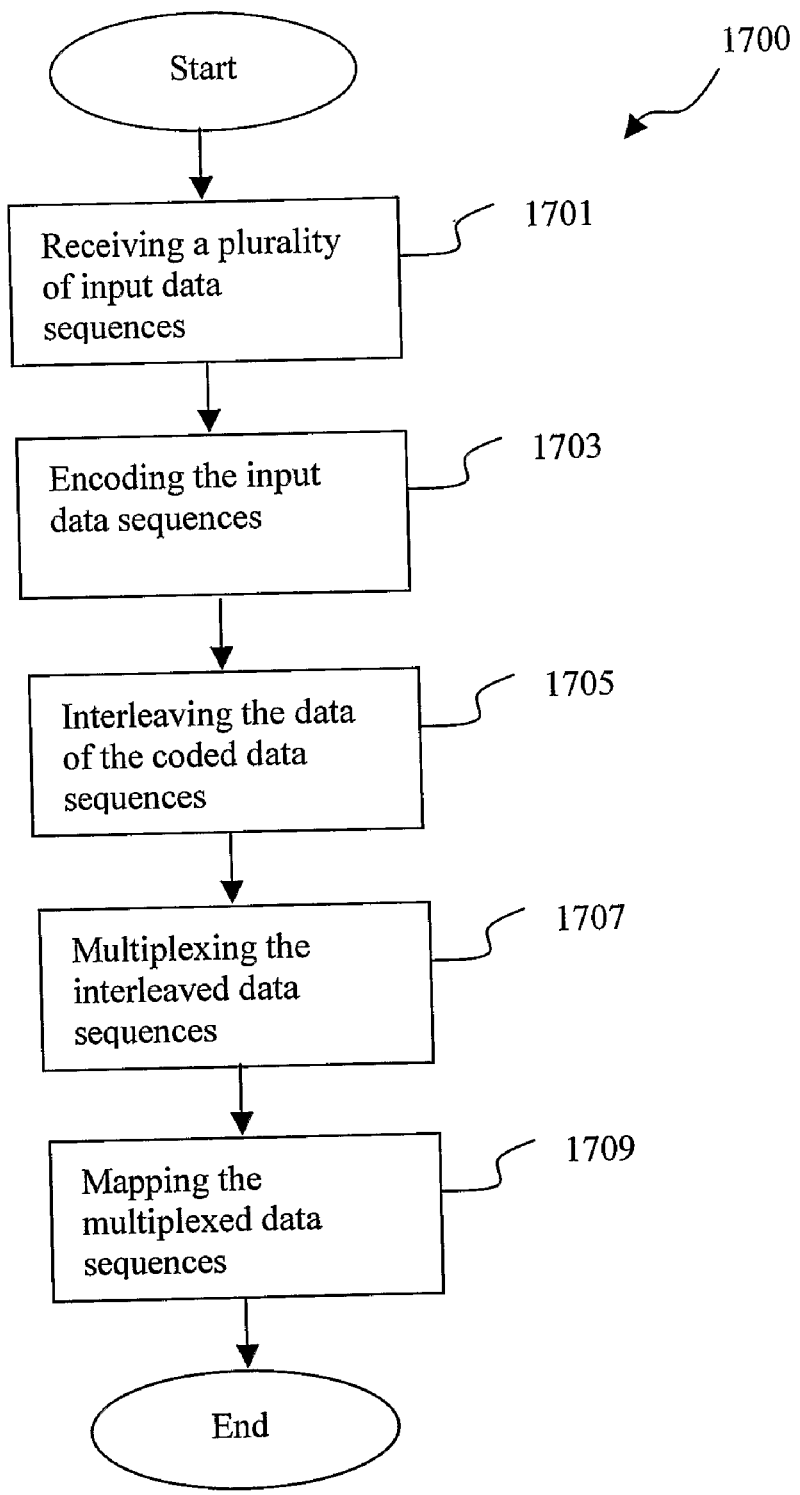
FIG. 17 is a flow diagram showing a method of transmitting data on the wireless communication system using the multiple transmit antennas according to one or more embodiments of the present invention.

A method 1700 of transmitting data on the wireless communications system 300 using the multiple transmit antennas 0105, will now be described with reference to FIG. 17. As described above, the input data corresponding to MBMS services comprises various content data with various QoS and/or transmission rate requirements. Each input data sequence is classified into different classes, namely, higher priority input and lower priority input, due to their importance.

The method 1700 begins at step 1701, where the encoder 0101 receives a plurality of input data sequences, each assigned with a priority level. As described above, data sequences with higher QoS/lower transmission rate requirements are assigned a higher priority level. At the next step 1703, the input data sequences are encoded in accordance with the assigned priority level to form a plurality of coded data sequences. As described above, the higher priority inputs are encoded by turbo encoder 0110 with a more powerful coding scheme to generate two parity data from systematic or information data. While for lower priority inputs, no or a simple coding scheme is implemented by encoder 0120 to generate one parity data from systematic data. The coded data sequences comprise systematic data and parity data.

At the next step 1705, the parity data and/or systematic data for the coded data sequences are interleaved to form a plurality of interleaved data sequences. Then at the next step 1707, the plurality of interleaved data sequences are multiplexed to form a plurality of multiplexed data sequences. As described above, two parity data and systematic data of higher priority data sequences, and the systematic data of the lower priority data sequences are multiplexed by multiplexer 0310. And the two parity data and systematic data of higher priority data sequences, and the parity data of the lower priority data sequences are interleaved within interleavers 0210, 0220, 0230 and 0240 respectively, and then multiplexed by multiplexer 0320.

The method 1700 concludes at the next step 1709, where the plurality of multiplexed data sequences are mapped to form a plurality of mapped data sequences for subsequent transmission of the mapped data sequences from the multiple transmit antennas 0510. As described above, the data sequences multiplexed by multiplexer 0310 are mapped to one antenna 0510 by space-time mapper 0410 and the data sequences multiplexed by multiplexer 0320 are mapped to another antenna 0520 by space-time mapper 0420. The mapping schemes of the space-time mapper 0410 and the space-time mapper 0420 may be different or same.

The described embodiments provide unequal error protection by employing the various coding together with space-time transmit diversity, and is well-suited for implementation in any wireless MIMO communications system. The requirements on quality of error protection and data rate may be achieved using various space-time mapping schemes for both priority data. The mapping schemes shown in FIG. 15 and FIG. 16 are only for illustrative purpose and should not be considered as the limitation of the invention. GENERIC DESCRIPTION BEGINS

INDUSTRIAL APPLICABILITY

It is apparent from the above that the embodiments described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of transmitting data in a wireless communications system using multiple transmit antennas, said method comprising the steps of:
   receiving a plurality of data sequences, each assigned with a priority level;
   encoding each of said plurality of data sequences in accordance with the assigned priority level to form a plurality of coded data sequences;
   multiplexing parity and systematic data of the coded data sequences of a higher priority level and at least a portion of systematic or encoded data from the coded data sequences of a lower priority level to generate a first multiplexed data sequence;
   mapping said first multiplexed data sequence to form a first mapped data sequence for subsequent transmission from one of said multiple transmit antennas,
   interleaving said plurality of coded data sequences to form a plurality of interleaved data sequences;
   multiplexing said plurality of interleaved data sequences to form a second multiplexed data sequence; and
   mapping said second multiplexed data sequence to form a second mapped data sequence for subsequent transmission from another one of said multiple transmit antennas.

2. The method according to claim 1, wherein the higher priority level indicates data with a higher quality requirement.

3. The method according to claim 1, wherein the lower priority level indicates data with a lower quality requirement.

4. The method according to claim 1, wherein in the encoding step more parity data are generated for higher priority data sequences than for lower priority data sequences.

5. The method according to claim 1, wherein said encoding step further comprising the sub-step of matching each of said coded data sequences to achieve a required transmission rate by rate matching.

6. The method according to claim 1, wherein said interleaving step further comprising the sub-step of interleaving the systematic data of higher priority and the parity data of higher priority coded data sequences, respectively.

7. The method according to claim 1, wherein said interleaving step further comprising the sub-step of interleaving the systematic data of higher priority and the parity data of lower priority coded data sequences, respectively.

8. The method according to claim 1, wherein said multiplexing step further comprising the sub-step of multiplexing a first portion of said interleaved data sequences to form said second multiplexed data sequence.

9. The method according to claim 7, wherein said multiplexing step further comprising the sub-step of multiplexing a second portion of said interleaved data sequences to form said second multiplexed data sequence.

10. The method according to claim 8, wherein said interleaved data sequences comprise some systematic data and/or some parity data of higher priority interleaved data sequences and lower priority interleaved data sequences.

11. The method according to claim 8, wherein said mapping step further comprising the sub-step of space time processing said first and second multiplexed data sequences to map said first and second multiplexed data sequences for transmission on different ones of the said multiple transmit antennas.

12. The method according to claim 1, wherein said transmission further comprising spreading said mapped data sequences such that the data sequences to be transmitted from said multiple antennas are mutually orthogonal.

13. The method according to claim 1, wherein said transmission further comprising spreading said mapped data sequences such that the data sequences to be transmitted from said multiple antennas are near-orthogonal.

14. A wireless communications system for transmitting data, said system comprising:
   a transmitter with multiple transmit antennas, said transmitter comprising:
      encoder units for receiving a plurality of input data sequences each assigned with a priority level, and encoding each of said plurality of input data sequences in accordance with the assigned priority level to form a plurality of coded data sequences;
      a first multiplexer unit for multiplexing parity and systemic data of the coded data sequences of a higher priority level and at least a portion of systematic or encoded data from the coded data sequences of a lower priority level to generate a first multiplexed data sequence;
      a first mapping unit for mapping said first multiplexed data sequence to form a first mapped data sequence for subsequent transmission from one of said multiple transmit antennas,
      interleaver units for interleaving said plurality of coded data sequences to form a plurality of interleaved data sequences;
      a second multiplexer unit for multiplexing said plurality of interleaved data sequences to form a second multiplexed data sequence; and
      a second mapping unit for mapping said second multiplexed data sequence to form a second mapped data sequence for subsequent transmission from another one of said multiple transmit antennas.

15. The system as in claim 14, said mapping units further comprising:
   a modulator for modulating said multiplexed data sequences according to a mapping scheme to form complex modulated data sequences; and
   an antenna processor for spreading said modulated data sequences such that the data sequences to be transmitted from said multiple antennas are mutually orthogonal or near-orthogonal.

16. The wireless communications system according to claim 14, further comprising a receiver with multiple receive antennas, said receiver comprising:
   a detector for detecting the data sequences received by said multiple receive antennas as transmitted by the transmitter with the multiple transmit antennas to generate a plurality of detected data sequences
   demapper units for demodulating said plurality of detected data sequences to generate a plurality of demodulated data sequences;
   de-multiplexer units for de-multiplexing said plurality of demodulated data sequences to form a plurality of de-multiplexed data sequences;
   de-interleaver units for de-interleaving said plurality of de-multiplexed data sequences to form a plurality of de-interleaved data sequences; and
   decoder units for decoding said plurality of de-interleaved data sequences to recreate said plurality of input data sequences according to said priority level.

17. A transmitter for transmitting data on a wireless communications system using a multiple transmit antennas, said transmitter comprising:

- encoder units for receiving a plurality of data sequences, each assigned with a priority level, and encoding each of said plurality of data sequences in accordance with the assigned priority level to form a plurality of coded data sequences;
- a first multiplexer unit for multiplexing parity and systematic data of the coded data sequences of a higher priority level and at least a portion of systematic or encoded data from said coded data sequences of a lower priority level to generate a first multiplexed data sequence;
- a first mapping unit for mapping said first multiplexed data sequence to form a first mapped data sequence for subsequent transmission from one of said multiple transmit antennas;
- interleaver units for interleaving said plurality of coded data sequences to form a plurality of interleaved data sequences;
- a second multiplexer unit for multiplexing said plurality of interleaved data sequences to form a second multiplexed data sequence; and
- a second mapper unit for mapping said second multiplexed data sequence to form a second mapped data sequence for subsequent transmission from another one of said multiple transmit antennas.

* * * * *